Dec. 28, 1965 R. G. RICHARDS 3,225,837
DEVICE FOR SPREADING MATERIAL ON LAWNS OR
FOR LEVELING SOFT SOIL AND THE LIKE
Filed May 11, 1964 3 Sheets-Sheet 1

INVENTOR
RONALD GEORGE RICHARDS
By Linton and Linton
ATTORNEYS

INVENTOR
RONALD GEORGE RICHARDS
By Linton and Linton
ATTORNEYS

Dec. 28, 1965          R. G. RICHARDS          3,225,837
           DEVICE FOR SPREADING MATERIAL ON LAWNS OR
              FOR LEVELING SOFT SOIL AND THE LIKE
Filed May 11, 1964                          3 Sheets-Sheet 3

INVENTOR
RONALD GEORGE RICHARDS
By Linton and Linton
ATTORNEYS

United States Patent Office 3,225,837
Patented Dec. 28, 1965

3,225,837
DEVICE FOR SPREADING MATERIAL ON LAWNS OR FOR LEVELING SOFT SOIL AND THE LIKE
Ronald George Richards, 3 Grosvenor Road, Meltham, Western Australia, Australia, assignor of one-half to Charles John Philip Smith, Sydney, New South Wales, Australia
Filed May 11, 1964, Ser. No. 373,898
3 Claims. (Cl. 172—371)

This invention relates to a device for spreading material such as top-dressing on lawns or for levelling the surface of soft soils and the like and is a continuation-in-part of my application Serial No. 222,596 filed September 10, 1962, now abandoned.

The object of the present invention is to provide a device which is relatively simple and economical in construction and which can be used for spreading material such as top-dressing on lawns in a substantially even manner, or for levelling the surface of soft soil preparatory to the planting of grass or like plants.

Broadly, the present invention resides in a device for spreading material on lawns or for levelling soft soils comprising an assembly of a plurality of closely spaced bars, each end of each bar being fixed to an end member to form a substantially rectangular assembly with the bars substantially parallel to each other, one end of a handle being pivotally mounted on the assembly for rotation about an axis substantially parallel to the bars, the shape of the bars being such that the portion of the bar in contact with the surface of the lawn or soil is substantially flat and the faces of the bar adjacent said portion are substantially vertical.

Figure 1:
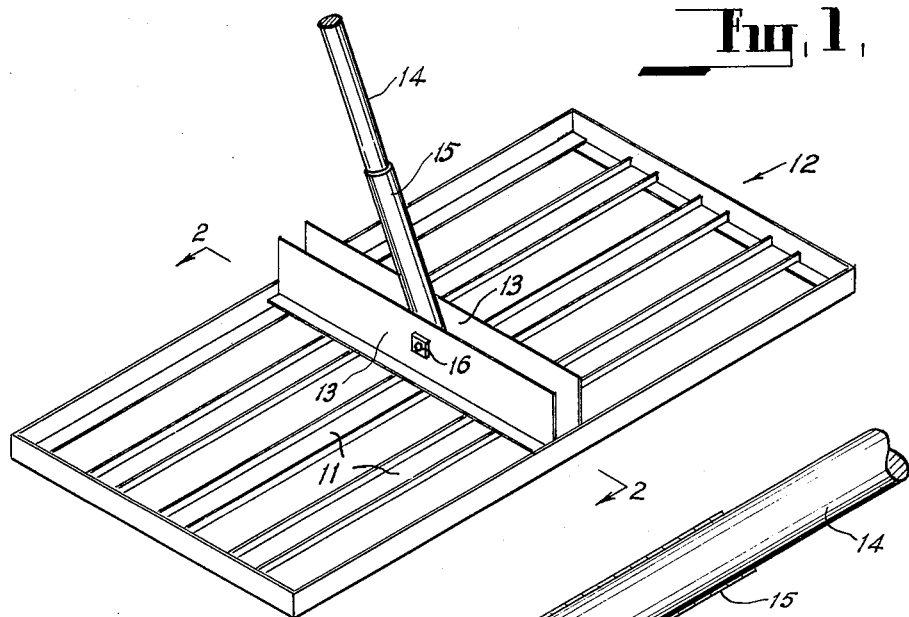
Figure 2:
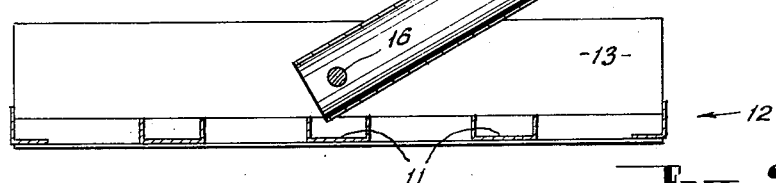
Figure 3:
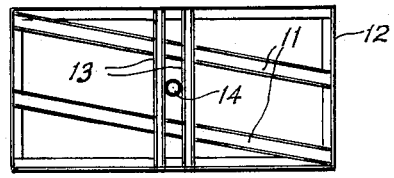
Figure 4:
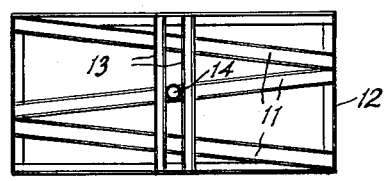
Figure 5:
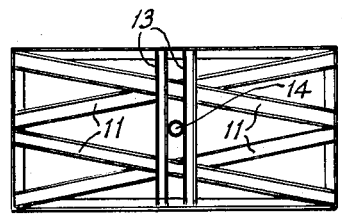
Figure 6:
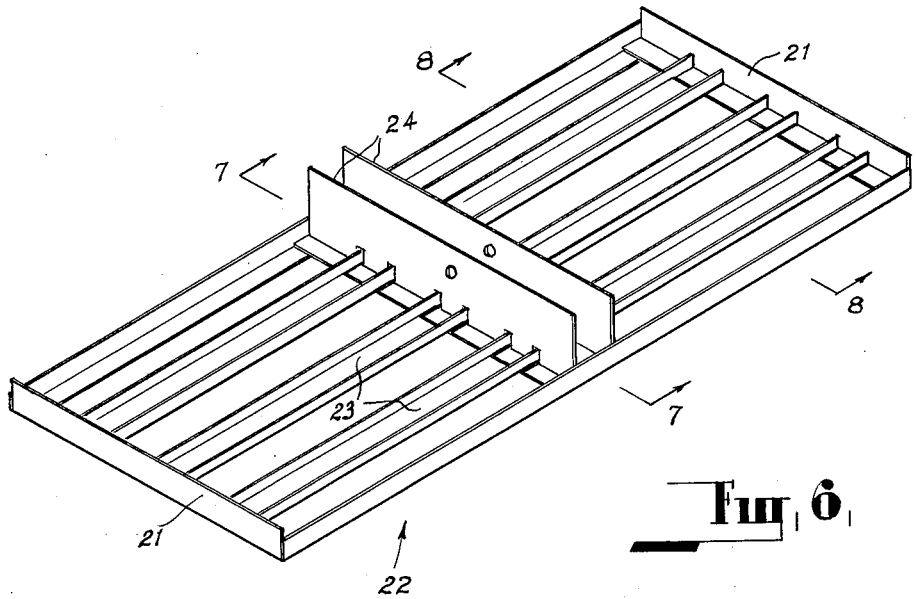
Figure 7:
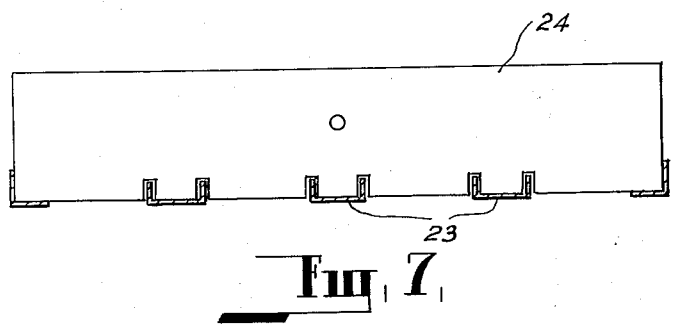
Figure 8:
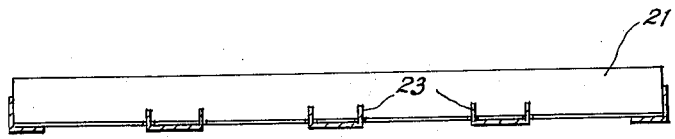
Figure 9:
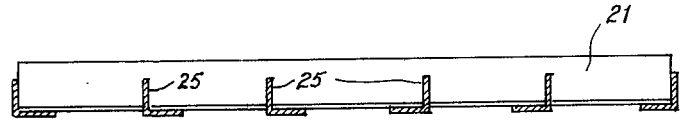
Figure 10:
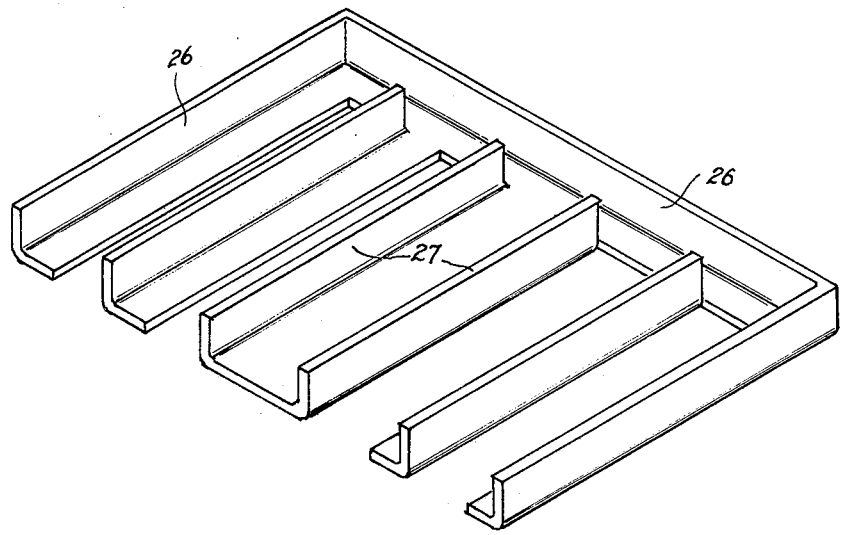

The present invention will be better understood by reference to the following description of the embodiments shown in the accompanying drawings, wherein:

FIG. 1 is a perspective view of a first embodiment;
FIG. 2 is a section on line 2—2 of FIG. 1;
FIGS. 3, 4 and 5 are each diagrammatic plan views showing possible alternative arrangements of the transverse bars;
FIG. 6 is a perspective view of a second embodiment;
FIG. 7 is a section on line 7—7 of FIG. 6;
FIG. 8 is a section on line 8—8 of FIG. 6;
FIG. 9 is a sectional view of a third embodiment corresponding to the sectional view shown in FIG. 8; and
FIG. 10 is a perspective view of a section of an assembly of a fourth embodiment.

Referring to the embodiment shown in FIGS. 1 and 2 of the drawings, a series of longitudinal spaced bars 11, formed from lengths of metal substantially U-shaped in cross section, are fitted inside a substantially rectangular frame 12 formed from metal folded to an angle. The ends of the bars 11 are fixed to the end members 10 of the frame by welding or any other suitable means. If desired, the longitudinal side members 9 of the frame 12 may be formed from bars of the same cross section as the bars 11. A pair of spaced upwardly projecting brackets 13 are fixed to the assembly in a substantially central position parallel to the end members of the frame. One end of a wooden handle 14 fitted with a metal sleeve 15 is pivotally mounted between the brackets by means of a bolt 16.

FIGS. 3, 4 and 5 of the drawings are top plan detail views which show alternative oblique arrangements of the longitudinal bars 11 within the frame 12.

In the second embodiment shown in FIGS. 6, 7 and 8 of the accompanying drawings, the end members 21 of the rectangular frame 22 are notched at 30 to receive the ends of the transverse bars 23. Frame 22 has side pieces 31 joined to end pieces 21. Likewise the lower edges of the centrally positioned upwardly projecting brackets 24 are notched as shown at 28 to receive the upwardly projecting portions of the bars 23 so that only the undersides of the bars 23 contact the surface of the lawn or other surface on which the device is used, eliminating the formation of small ridges or furrows which in the first embodiment may be formed by the lowermost portions of the end members 10 of the frame 12 of the first embodiment shown in FIGS. 1 and 2 of the drawings.

In use, the material to be spread on the lawn is distributed at random by shovel or barrow over the area and then the device of the present invention is pushed back and forth by the operator over the surface of the lawn. The assembly of bars remains substantially parallel to the surface of the lawn, the bars being substantially transverse to the direction of travel of the device parallel to brackets 13 and 24. The material piles up in the spaces between the bars and drops into any hollows in the surface of the lawn where required and is thus spread evenly over the area. In effect, the device is used to iron out the material evenly over the lawn. Likewise, it can be used for finally levelling the surface of an area of soft soil or sand preparatory to planting of a lawn or preparing the surface of a seed bed or any other operation which requires a level surface.

To achieve satisfactory spreading of the material over the surface of the lawn or levelling of the soil, it is essential that the base portion of each of the bars in contact with the surface of the lawn or soil is substantially flat and that the lateral faces of the bar adjacent said base portion are substantially vertical. If the said lateral faces are not substantially vertical, as would be the case if the bars are of circular cross section, they tend to slice through the piles of material with very little spreading effect.

In the third embodiment shown in section in FIG. 9 of the drawings the assembly is constructed in a manner substantially identical to that of the second embodiment shown in FIGS. 6, 7 and 8 of the drawings with the exception that the U-shaped bars 23 of FIG. 6 have been replaced by bars 25 which are substantially L-shaped in cross section.

In the fourth embodiment shown in FIG. 10 of the drawings, the assembly of bars is formed by cutting and folding a piece of sheet metal. The terminal periphery of the piece of metal is bent to form an upwardly projecting flange 26, the corners of which are welded or otherwise secured together. The portion of the metal structure within the flanges 26 is then provided with a series of cuts, the bases of the cuts being substantially parallel to each other. The edges of the cut portions are then bent upwardly to form bars which for central bar 27 are of U-shape and for lateral bars 29 are L-shaped. The assembly is pivotally mounted on one end of a handle in any suitable manner.

I claim:
1. In a device for manually spreading material on lawns, a rectangular metal frame, having end pieces and side pieces, a plurality of bars having a base portion and a lateral portion mounted extending parallel to said side pieces, a pair of closely spaced bracket plates centrally mounted in said frame and extending upwardly transversely thereof between said side pieces, a handle pivotally mounted between said bracket plates, the lower edges of said bracket plates and said end pieces being marginally notched for flush reception of said bars within the periphery of said bracket plates and end pieces, said bars being mounted in said frame with their base portions parallel to the plane of said frame.

2. A device as recited in claim 1, said bars being of U-shape.

3. A device as recited in claim 1, said bars being of L-shape.

References Cited by the Examiner
UNITED STATES PATENTS

| | | | |
|---|---|---|---|
| 888,609 | 5/1908 | Guffey | 37—175 |
| 941,340 | 11/1909 | Bladholm | 37—175 |
| 1,094,313 | 4/1914 | Dowell | 37—175 |

FOREIGN PATENTS 838,249 6/1960 Great Britain.

ABRAHAM G. STONE, *Primary Examiner.*

T. GRAHAM CRAVER, F. B. HENRY,
*Assistant Examiners.*